United States Patent Office 2,956,790
Patented Oct. 18, 1960

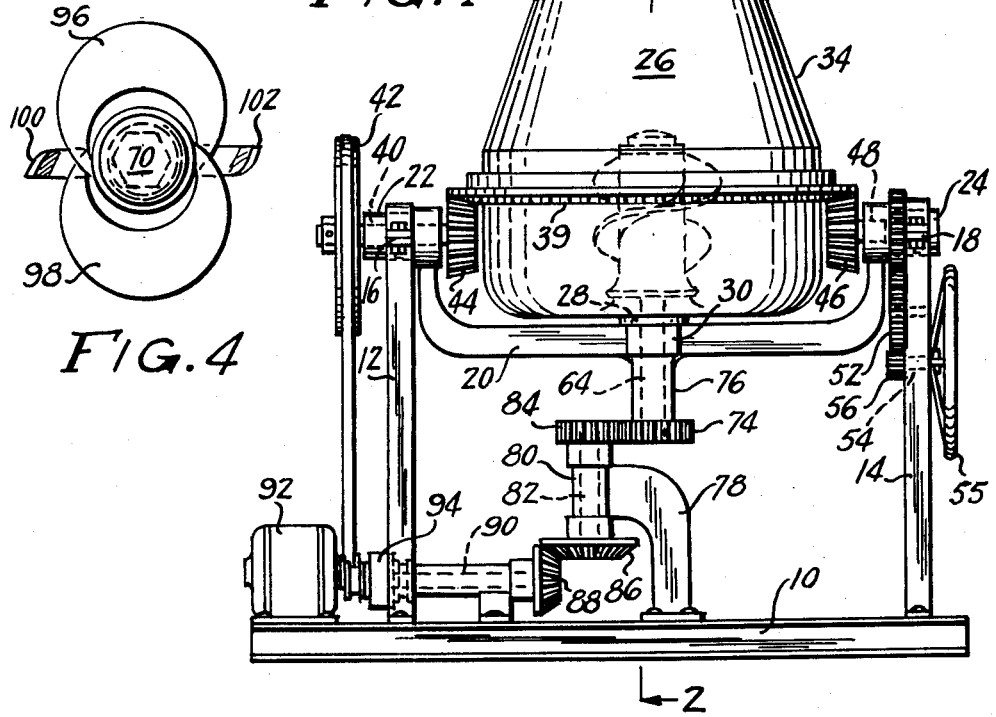

2,956,790

APPARATUS FOR PRODUCING MECHANICALLY AERATED CONCRETE

Saburo M. Moriya, Tokyo, Japan

Filed Aug. 29, 1957, Ser. No. 681,026

2 Claims. (Cl. 259—171)

This invention relates to an apparatus for producing air entrained concrete.

An object of this invention is the production of an air entrained cementitious mortar without the employment of chemically reacting additives to create air or gas cells.

Another object of this invention is the incorporation of a foaming agent such as a detergent in a slurry of cement, sand and water and then adding air in a manner to distribute minute or microscopic air bubbles throughout the mass.

A further object of this invention is the production of an air entrained cementitious slurry and adding aggregates thereto.

In the known methods of making aerated concrete, some kind of gas or bubble producing agent such as metallic alumina, fly ash or slag is added to the mix and reacts with the cement and water to form large gas bubbles. Such mixes are not stable nor easy to control and are subject to shrinkage. Furthermore, concrete made in this manner is not waterproof after setting. Also, it is difficult to incorporate aggregates into such a slurry, as the tumbling of the mix tends to break up the gas bubbles.

In the preparation of mortar by my method, I prepare a slurry of sand, water and cement, and a foaming agent in the desired proportions. The foaming agent which I use is not chemically reactive. I prefer to use an alkali metallic chloride of a sulphuric acid compound or the sodium chloride of a benzine sulphuric acid compound of fatty acids having 10 to 12 molecules of carbon with the addition of a small amount of a diethanolamide or a diethanolamine of a secondary long chain sulphonated paraffin which has been neutralized with sodium hydroxide.

A satisfactory compound for my purposes is a product manufactured by the Shell Oil Co. called Teepol. This product is said to be a sodium salt of a higher alkyl sulphate, derived from petroleum.

The prepared aerated mix may be further stabilized by the addition of a small amount of a Methocol 6000 B.V.A. or a polyvinyl acetate compound. Such materials prevent cracking during curing and assist in rendering the concrete waterproof.

A slurry made as thus described, is whipped by means of a rapidly rotating impeller to draw air into the slurry and to break up the air into minute microscopic bubbles. The foaming agent operates like tiny soap bubbles and holds in an emulsion and suspension the particles of cement and sand.

An apparatus suitable for the production of air entrained cement and carrying out my method is disclosed in the accompanying drawings, which taken with the following specification constitute a complete disclosure of the invention.

In the drawings wherein like characters of reference indicate like parts throughout;

Figure 1 is a front elevation of a mixer for producing air entrained concrete according to the method of this invention;

Figure 2 is a view at a right angle to the view in Figure 1, partly in section, showing the interior of the drum in the position for mixing aggregates;

Figure 3 is a fragmentary part sectional view showing the whipping means, and

Figure 4 is a top view of the structure shown in Figure 3.

Referring now to Figure 1, a base member 10 is provided with uprights 12, 14 having trunnion bearings 16, 18 respectively at their upper ends. A yoke 20 has trunnions 22, 24 supported in the bearings 16, 18 and is adapted to support the mixing drum 26. In line with the axis of the drum 26 there is provided a tube 28 extending through bearing 30 in the yoke 20. The drum 26 is cup shaped having a substantially cylindrical wall 32 and an upwardly and inwardly tapering substantially frusto conical wall 34. The junction between the cylindrical wall and the bottom is rounded as at 36.

At or near the upper end of the cylindrical wall portion 32, a beveled gear 39 is provided. The trunnion 22 is bored to accommodate a short shaft 40 having a pulley 42 at one end and a bevel gear 44 at the other end engaging the ring 39. A similar bevel gear 46 engaging the ring gear 39 is mounted on a stub shaft 48 in the trunnion 24. When power is applied to the pulley 42, by means of a suitable belt or the like, the gear 44, engaging the ring gear 39 causes rotation of the drum in a well known manner. The ingredients placed in the drum will be mixed in the usual manner, assisted by the internal stirrer members 50 mounted on the inner surface of the drum 26. For this purpose, the drum will be tilted substantially as shown in Figure 2. For tilting the drum, an arcuate rack 52 is affixed to the trunnion 24. A stub shaft 54 mounted in a suitable bearing in upright 14 has a pinion 56 at one end engaging the rack 52, and a hand wheel 55 at the other end to constitute a means for tilting the mixer drum. The axis of rotation of the drum is the axis of symmetry thereof.

A hub 58 is mounted in the bottom of the drum coaxially with the axis thereof and extends upwardly therein, substantially in line with the hub 28 and is provided with bearings 60, 62 for a shaft 64. An agitator hub 66 is attached to the upper end of the shaft 64 by means of a nut 68 and surrounds the hub 58. A seal 70 is affixed to the upper end of the hub 66 to protect the nut 68. The hub 68 has a portion 72 near its lower end curved outwardly to merge with the bottom 38 of the mixer drum 26.

The shaft 64 extends below the yoke 20 and has a gear 74 at its lower end. A sleeve 76 is placed between the yoke 20 and the gear 74. A standard 78 having a bracket 80 extending from its upper end, is attached to the base 10. The bracket 80 is suitably bored for a vertical shaft 82 having a spur gear 84 at its upper end and a bevel gear 86 at its lower end. The bevel gear 86 meshes with a bevel gear 88 on a shaft 90 rotatably mounted in the upright 12. A motor 92 is mounted on the base 10 and is connected with the shaft 90 by a well known jaw clutch 94.

A pair of spirally arranged whipping blades or stirrers 96, 98 are mounted on the hub 66, being suitably attached thereto at their upper ends and being spaced therefrom at intermediate points. An additional pair of agitator blades 100, 102 extend outwardly a short distance from the lower end of the hub member 66. The spaces 104, 106 between the blades 96, 98 respectively and the hub 66 permit the suction of air into the batch in the mixer.

After loading the mixer with the correct proportion of foaming agent, water, cement and sand, it is placed in the tilted position of Figure 2 and rotated by pulley 42 until ordinary thorough mixing takes place. The mixer is then uprighted so that gear 74 engages with gear 84. The motor 92 is then clutched to shaft 90 and is started. This rotates the shaft 64 at high speed and whips the mixture in a vortical action, sucking air into it through the spaces 104, 106. The blades 96, 98 and the agitators 100, 102 break up the air into very small masses which are enclosed or encased by the foaming agent in the manner of soap film enclosing air in the production of soap bubbles. The whipping action causes the mixture to become cream like in appearance. This method usually employs less than the normal amount of water for a particular batch due to the high wetting action of the detergent. After the desired amount of air has been beaten into the slurry a sufficient amount of stabilizing agent is then added and whipped until thorough mixing takes place; and the motor 92 is stopped and unclutched and the mixer is tilted to the emptying position such as in Figure 2 which disengages the gears 74 and 82. If desired, the drum and whipper can act simultaneously for quicker action during the aeration stage. The mix thus produced is stable. The air does not escape, nor is there any separation of ingredients, and the mix is workable to a degree not heretofore known. Gravel, crushed stone or other aggregates may be added if desired with the whipper blades disengaged. A few turns of the drum thoroughly coats the aggregates with the air entrained mix. It is found that the concrete made by this method can accommodate more and larger aggregates in the nature of rocks or crushed stone. A cement, sand gravel mix ratio of 1–4–8 is found to be highly practical. The slurry coats the aggregates thoroughly due to the inherent wetting out characteristics of the materials used. There is a considerable volume increase in my air entrained concrete, which with the improved physical properties and workability more than offset the added cost of the additive.

It is to be understod that various modifications may be made within the skill of the art and the scope of the appended claims.

I claim:
1. A mixer for producing air entrained cement motar comprising an open substantially cup-shaped drum rotatable about a major axis and having mixing blades on its interior surface, means for tilting said drum to mixing position and to discharging position, means for rotating the drum for mixing material therein while tilted in mixing position, a whipping agitator rotatably mounted in the drum in said major axis, said whipping agitator including a hub in the bottom of the mixer, a shaft mounted in the hub; a plurality of spirally arranged vortex producing blades on the shaft spaced therefrom intermediate their ends for entraining air into a mix in the drum and downwardly and radially directed agitator blades on the shaft below said spirally arranged blades, for breaking up the entrained air into bubbles, and other means for independently rotating the shaft at high speed with the drum axis substantially vertical.

2. The mixer according to claim 1 wherein the whipping agitator shaft extends through the hub member is provided with a gear outside the drum and the means for driving the shaft at high speed includes gear means engageable with said gear.

References Cited in the file of this patent
UNITED STATES PATENTS

| | | |
|---|---|---|
| 747,154 | Durand | Dec. 15, 1903 |
| 1,437,246 | Horton | Nov. 28, 1922 |
| 1,453,323 | Palmeter | May 1, 1923 |
| 1,542,035 | Cone | June 16, 1925 |
| 1,630,361 | Stay et al. | May 31, 1927 |
| 1,657,716 | Hinton | Jan. 31, 1928 |
| 1,693,935 | Nelles | Dec. 4, 1928 |
| 1,756,789 | Hinton | Apr. 29, 1930 |
| 1,783,955 | Chamberlain | Dec. 9, 1930 |
| 1,801,685 | Olson | Apr. 21, 1931 |
| 2,098,483 | Bonham | Nov. 9, 1937 |
| 2,494,118 | Essick | Jan. 10, 1950 |
| 2,499,148 | Lichtenberg | Feb. 28, 1950 |
| 2,651,582 | Courtney | Sept. 8, 1953 |
| 2,799,485 | Silverman | July 16, 1957 |

FOREIGN PATENTS

| | | |
|---|---|---|
| 70,060 | Netherlands | May 15, 1952 |
| 262,595 | Great Britain | Dec. 16, 1926 |
| 1,047,214 | France | July 22, 1953 |